United States Patent
Odenthal et al.

(10) Patent No.: US 7,330,785 B2
(45) Date of Patent: Feb. 12, 2008

(54) METHOD FOR INCREASING THE DRIVING STABILITY OF A MOTOR VEHICLE

(75) Inventors: Dirk Odenthal, Munich (DE); Roland Lohninger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/649,864

(22) Filed: Jan. 5, 2007

(65) Prior Publication Data

US 2007/0185638 A1    Aug. 9, 2007

Related U.S. Application Data

(63) Continuation of application No. PCT/EP2005/006408, filed on Jun. 15, 2005.

(30) Foreign Application Priority Data

Jul. 20, 2004    (DE) ............ 10 2004 035 004

(51) Int. Cl.
    *G06F 7/00* (2006.01)
(52) U.S. Cl. ............ 701/70; 701/71; 701/42; 303/140; 303/146
(58) Field of Classification Search ............ 701/41, 701/42, 70, 71; 303/140, 146
    See application file for complete search history.

(56) References Cited

U.S. PATENT DOCUMENTS 5,494,345 A    2/1996    Inagaki et al.
6,427,102 B1 *    7/2002    Ding ............ 701/34
2005/0256622 A1    11/2005    Futterer et al.
2006/0108863 A1 *    5/2006    Gronau et al. ............ 303/122

FOREIGN PATENT DOCUMENTS

DE    40 30 704 A1    4/1992
DE    102 26 683 A1    12/2003

OTHER PUBLICATIONS

A. van Zanten, et al. "FDR—Die Fahrdynamikregelung von Bosch"; ATZ Automobiltechnische Zeitschrift; 1994; vol. 96, Book 11; pp. 674-678 and 683-689.

J.T. Kasselmann et al., "Adaptive Steering", Bendix Technical Journal, Autumn 1969, pp. 26-35.

Wolfgang Kraemer et al., "Potential Functions and Benefits of Electronic Steering Assistance", XXVI Fisista Congress, Jun. 17-21, 1996, pp. 1-15, Paper B0304.

Von Edmund Donges et al., "Funktion und Sicherheitskonzept der Aktiven Hinterachskinematik von BMW (Function and Safety Concept of the Active Rear Axle Kinetics of BMW)", ATZ Automobiltechnische Zeitschrift (Automobile Technology Magazine), 1990, pp. 580-587, Book 10, No. 92.

(Continued)

*Primary Examiner*—Gertrude A. Jeanglaude
(74) *Attorney, Agent, or Firm*—Crowell & Moring LLP (57) ABSTRACT

A method for increasing the directional stability of a motor vehicle is provided, as well as a corresponding device, and a corresponding computer program product. A model-supported pilot control is used to determine a stabilizing yaw torque, which is applied to the motor vehicle to influence the yaw torque of the motor vehicle.

25 Claims, 5 Drawing Sheets

OTHER PUBLICATIONS

Anton TH Van Zanten et al, "Die Fahrdynamikregelung von Bosch (Vehicle Dynamics Control by Bosch)", ATZ Automobiltechnische Zeitschrift (Automobile Technology Magazine), 1994, pp. 359-365, vol. 96.

Von P. Riekert et al., "Zur Fahrmechanik des gummibereiften Kraftfahrzeugs (On the Driving Mechanics of the Rubber-Tired Motor Vehicle)", Ingenieur-Archiv (Engineer Archive), 1940, pp. 210-224, Berlin.

Gerhard Fischer et al., "X-Drive—Der neue Allradantrieb im BMW X3 und BMW X5 (X-Drive- The New All-Wheel-Drive in the BMW X3 and BMW X5)"Automobiltechnische Zeitschrift ATZ, pp. 92-103, Issue No. 2004-02.

International Search Report dated Sep. 29, 2005 with the English translation (Four (4) Pages).

German Search Report dated Apr. 20, 2005 with the English translation of the relevant portion (Eight (8) Pages).

* cited by examiner

METHOD FOR INCREASING THE DRIVING STABILITY OF A MOTOR VEHICLE

CROSS REFERENCE TO RELATED APPLICATIONS

This application is a continuation of PCT International Application No. PCT/EP2005/006408, filed Jun. 15, 2005, which claims priority under 35 U.S.C. § 119 to German Patent Application No. 10 2004 035 004.3 filed Jul. 20, 2004, the entire disclosures of which are herein expressly incorporated by reference.

BACKGROUND AND SUMMARY OF THE INVENTION

The present invention relates generally to motor vehicles and, more particularly, to a method for increasing the directional stability of a motor vehicle, a corresponding device, and a computer program product.

Multiple methods and corresponding vehicle dynamics control systems exist. These methods and systems may use a targeted change of the overall vehicle dynamics. Separate influencing of the lateral, yaw, longitudinal, lift, pitch, and roll dynamics is also possible. These control systems, which are described briefly in the following in a selection, use various actuators and various engagement principles:

1. Active Steering Engagements

In conventionally steered vehicles, there is a fixed relationship between steering wheel angle and the steering angle of the steered wheels, accordingly the front wheel steering angle, with conventional front wheel steering. Using active steering, in addition to the steering angle $\delta_L$ applied by the driver, an auxiliary steering angle $\delta_C$ may be set. The driving conditions are detected by a suitable sensor system and are used to generate a stabilizing auxiliary steering angle via a guideline and a steering actuator. Approaches for increasing the directional stability in a vehicle by active steering interventions are disclosed, for example, in DE 102 21 717 A1 and DE 101 41 273 A1.

In active steering, stabilization of the lateral and yaw dynamics is caused via an active intervention in the front wheel steering and/or also the rear wheel steering (see DE 40 28 320 C2). The fundamental article "Adaptive Steering" by J. T. Kasselmann and T. W. Keranen, Bendix Technical Journal, 1969, pages 26-35, describes mechanical additive steering integrated in an experimental vehicle, in which a hydraulic actuator is used to set an auxiliary steering angle in addition to the steering angle applied via the steering wheel via a lateral displacement of the steering gear. A further principle of additive steering was presented at the XXVI. Fisista Congress in Prague 1996 by W. Krämer and M. Hackl in the paper "Potential functions and benefits of electronic steering assistance," Paper B0304, pages 1-15. Under this principle, the auxiliary steering angle is generated mechanically by a rotation of the divided longitudinal column using a planetary gear driven by an electric motor. The possibilities of active rear axle steering are discussed by E. Donges, inter alia, in the article "Funktion und Sicherheitskonzept der aktiven Hinterachskinematik von BMW [Function and safety concept of the active rear axle kinematics of BMW]," which is published in Automobiltechnische Zeitschrift [Automobile Technology Magazine], Book 10, pages 580-587, 1990.

2. Individual Wheel Braking Interventions

A stabilizing yaw torque may be applied to the motor vehicle by individual-wheel modulation of the brake pressure (pressure increase, pressure reduction) in current brake systems equipped with ESP and ABS. With an antilock braking system (ABS) and existing vehicle dynamics control systems, such as the electronic stability program (ESP) from Bosch, stabilizing interventions are made in the vehicle dynamics in situations critical to the longitudinal, lateral, and yaw dynamics. These interventions are made in such a way that the vehicle remains able to be handled as much as possible in a typical way by the driver. A relevant discussion is in the technical article by A. van Zanten, inter alia: FDR—Die Fahrdynamikregelung von Bosch [VDC—Vehicle Dynamics Control by Bosch] in ATZ Automobiltechnische Zeitschrift, 1994, volume 96, Book 11, pages 674-689.

3. Interventions Via Change of the Lateral Force or Lateral Torque Distribution A device for lateral torque distribution on the rear axle of a motor vehicle is disclosed, for example, using a superimposed transmission made of a planetary differential and two superimposed clutches in EP 575 151 A1 "Vehicular left/right drive force adjusting apparatus." A lateral force or lateral torque distribution on the front and/or rear axle may also be implemented in principle by combined braking and engine interventions.

4. Interventions Via Change of the Longitudinal Force or Longitudinal Torque Distribution A longitudinal torque or longitudinal force distribution disclosed under the product name X-Drive has been disclosed in a technical article by G. Fischer, W. Pfau, H.-S. Braun, and C. Billig under the title "x-Drive—Der neue Allradantrieb im BMW X3 und BMW X5 [x-Drive—the new all-wheel-drive in the BMW X3 and BMW X5]" in Automobiltechnische Zeitschrift ATZ, Issue number: 2004-02. The drive and drag torque may be distributed continuously between the front and rear axles via a possibility available via this system, inter alia, of variable longitudinal force or longitudinal torque distribution LV, by which a defined yaw torque may be applied indirectly via the modulation of the longitudinal forces axle by axle.

5. Interventions Via Change of Wheel Contact Forces

Systems for applying a stabilizing yaw torque by modulating the roll stiffness distribution between the front and rear axles within a motor vehicle have become known under the names "Active Body Control" (ABC). This engages directly via the secondary suspension and thus influences, in addition to roll dynamics, also lift and pitch dynamics, and thus, inter alia, the "pitch stiffness distribution," or "Dynamic Drive" (DD). A further possibility for influencing the wheel contact forces and thus the longitudinal and lateral forces indirectly is given via the roll stiffness distribution.

6. Interventions Via Engine Regulation

Alternatively or additionally to braking interventions in particular, regulating interventions may also be performed via engine regulation. By modulating the longitudinal dynamics, the lateral and yaw dynamics may thus be influenced indirectly. For this approach, reference is made to technical literature, such as the handbook by Manfred Mitschke, Dynamik der Kraftfahrzeuge [Dynamics of Motor Vehicles], Volume A, Antrieb und Bremsung [Drive and Braking], Springer Verlag, third revised edition 1995.

Thus, based on the approaches for increasing the directional stability, acting to stabilize the driving properties of a motor vehicle by influencing a yaw torque is also known.

An early basis for a general investigation of the driving properties of motor vehicles is represented by the single-track model, which was already published in 1940 by R. Riekert and T. Schunk under the title "Zur Fahrmechanik des gummibereiften Kraftfahrzeug [On The Driving Mechanics of the Rubber-Tired Motor Vehicle]" in Ingenieur-Archiv [Engineer Archive]. Every motor vehicle is reduced to a planar bicycle herein. On the basis of the single-track model, for example, DE 195 15 051 A1 discloses a yaw rate and float angle velocity controller, in which the yaw rate and float angle are calculated via an observer. An additional yaw torque is generated as a controlled variable by a corresponding controller. The method operates using selective braking interventions on the wheels of the motor vehicle, as described above for the individual-wheel braking interventions.

DE 195 15 053 A1 also discloses a yaw torque controller for vehicle stabilization, a difference in the slip angle between the front axle and the rear axle being used as the controlled variable here, however. Reference values for a yaw rate are again calculated on the basis of the single-track model for motor vehicles with reference to steering angle, wheelbase, velocity, and a constant to be predefined for understeering or oversteering the motor vehicle.

Another relevant method is known from DE 100 11 779 A1. According to such a method, regulation of the directional stability of a motor vehicle without a yaw rate sensor is possible in that an actual yaw angle velocity is estimated by incorporating actual forces engaging on the tires and a current steering angle via integration of the yaw angle velocity.

Consistent with the present invention, a method for stabilizing a motor vehicle which responds more rapidly than in the prior art and is thus also improved in regard to its reliability may be provided, as well as a corresponding device and a computer program product.

Consistent with the present invention, a method for providing directional stability for a motor vehicle by influencing a yaw torque of the vehicle is provided. The method may comprise: determining a stabilizing yaw torque using a model-supported pilot control; and applying the stabilizing yaw torque to the motor vehicle to influence the yaw torque of the vehicle.

Consistent with the present invention, an apparatus for providing directional stability for a motor vehicle by influencing a yaw torque of the motor vehicle is provided. The apparatus may comprise: means for performing a model-supported pilot control to determine a stabilizing yaw torque; and at least one actuator for transmitting at least one output signal corresponding to the model-supported pilot control to influence the yaw torque of the motor vehicle.

Consistent with the present invention, a computer program product, which comprises a computer-readable medium containing instructions for controlling a system to influence a yaw torque of a motor vehicle, is provided. The system is operable to execute the instructions. The instructions may comprise: instructions for obtaining at least one input variable from at least one of a sensor system, a regulating system, and a driver assistance system; and instructions for applying an additional stabilizing yaw torque to influence the yaw torque of the motor vehicle, wherein the additional stabilizing yaw torque is applied based on a model-supported pilot control and a processing of the at least one input variable.

Consistent with the present invention, a model-supported pilot control may be used to apply a compensating yaw torque to the motor vehicle. Regulation has the disadvantage that it may first be engaged upon the occurrence of the deviation. Before an effective intervention of the regulation, a certain time span must thus always pass, within which a deviation typically increases further. In contrast, a model-supported pilot control already reacts on the basis of the variables which a subsequent change or deviation would always cause if a model-base compensation variable was not already provided by the pilot control. Consistent with the present invention, a model-supported pilot control and/or stabilization function is understood as a function which uses driver inputs and/or longitudinal-dynamic measured and/or estimated variables to generate a lateral-dynamic controlled and/or output variable.

The pilot control is thus based on predefined values as input data for a model for predicting or estimating reactions. Every form of a regulation, in contrast, first builds on a vehicle reaction. Accordingly, a time delay results in relation to a method based on pilot control due to the occurrence of a regulatory deviation. Therefore, a pilot control engages more rapidly than regulation. As a function of the quality of the model used as a basis, a significant reduction of the interfering variable up to its complete compensation and/or elimination is caused by the compensation variable. Consistent with the present invention, a compensating yaw torque may be applied to the motor vehicle to reduce a longitudinal dynamic influence on the lateral and yaw dynamics. Accordingly, a device and a computer program product for implementing a method consistent with the present invention may be implemented independently.

Consistent with the present invention, a significant reduction of the longitudinal dynamic influence on the lateral and yaw dynamics of the motor vehicle may be achieved in that the pilot control may be based on a vehicle model which is a single-track model expanded by longitudinal dynamic influences. The single-track model may be improved in principle in regard to its modeling precision by a dual-track model, as disclosed, for example, in DE 40 30 704 A1. However, this is only true if, inter alia, parameters and characteristic curves of the dual-track model are also provided via online identification. A more rapid compensation intervention may be achieved with acceptable parameterization and/or computing outlay only on the basis of a single-track model modified in the above way.

Consistent with the present invention, decoupling of the lateral/yaw dynamics from the longitudinal dynamics may be advantageously caused. For this purpose, in an implementation of the present invention, at least one variable may be used in the model-supported pilot control which results from a difference between the single-track model and the single-track model expanded by longitudinal dynamic influences.

The prior art lacks methods for the control-engineering design of a vehicle dynamics controller which describe a systematic design of a control system for implementing decoupling of the lateral and/or yaw dynamics from the longitudinal dynamics of the vehicle, because this is not a goal of the control systems on the market. Because of practical restrictions, decoupling is also only possible in a limited way because of the existing regulator structures according to the prior art and the goals followed.

In systems having individual-wheel braking interventions, the influence of the longitudinal dynamics on the yaw behavior is taken into consideration as a function of the driving situation with specific braking delay by wheel-selective reduction and/or increase of the braking pressure. In load change reactions, the engine control may ensure that the drag torque is as small as possible. The influence of the load change reactions on the yaw behavior is thus also minimized. The setpoint value calculation for yaw rate, lateral acceleration, and float angle velocity in current regulatory systems (e.g., AL, DSC/ESP, DD/ABC, etc.) is based on the typical single-track model, i.e., without consideration of the longitudinal dynamic. For this purpose, a quasi-stationary velocity change is assumed. The change of the longitudinal dynamics is not considered in a typical single-track model. A change of this type is viewed as interference by the directional stabilization systems constructed thereon, which is only partially regulated out because of the system. However, this property requires additional steering effort by a driver and may already cause nonlinear behavior of the vehicle, which is especially difficult to control, in the linear range of the tires. Compensating steering interventions of the driver in the linear range may, for example, already result in destabilization of the vehicle due to overcompensation in the event of load change reactions, i.e., due to too late and too strong reaction of the driver. This phenomenon may bear the name "Driver Induced Oscillations."

Decoupling of the lateral and yaw dynamics from the longitudinal dynamics as specified above, in contrast, causes, in case of drive, load change, and braking, inter alia:
  linear yaw behavior in the linear range of the tires;
  reduction of the steering effort during acceleration, deceleration, or load change;
  predictive stabilization by pilot control;
  avoiding "driver induced oscillations;"
  easier controllability of the vehicle by the driver with advantageous enlargement of the linear range; and
  shortening of the braking distance.

Additionally, decoupling of the lateral and yaw dynamics from the longitudinal dynamics as specified above is usable via actuators in active front wheel steering and/or active steering AL, active rear wheel steering HL, lateral torque distribution on the rear axle QH, lateral torque distribution on the front axle QV, longitudinal torque or longitudinal force distribution LV in all-wheel-drive vehicles, and active suspension regulating systems (DD, ABC). With implementation using active front wheel steering (AL) and/or active rear wheel steering (HL) and/or lateral torque distribution on the rear axle QH and/or lateral torque distribution on the front axle QV, increased stability reserves and/or increases of the linear range in relation to the particular axle additionally result. Moreover, the present outlined approach is distinguished by easy applicability, since it is completely physically motivated, which will be discussed in greater detail in the following on the basis of exemplary embodiments of the present invention with reference to figures of the drawing. In spite of assumptions and simplifications, which will also be referred to in detail, the selected approach has a high robustness against model error.

Consistent with an embodiment of the present invention, three variables may be used as input signals for a pilot control method:
  1. an effective steering angle, which may result from a driver steering angle,
  2. a vehicle reference velocity, which is provided in all current vehicle control systems, and
  3. a value for the longitudinal acceleration, which may advantageously be output by a longitudinal acceleration sensor, or determined from engine and braking torque values or from the time derivative of the vehicle reference velocity.

The term model-supported pilot control and/or stabilization function is thus understood here, consistent with the present invention, as a function which, to generate a lateral-dynamic controlled and/or output variable, exclusively uses driver inputs, such as steering angle, gas pedal setting, brake pedal setting, and/or longitudinal-dynamic measured and/or estimated variables for longitudinal acceleration $a_x$, velocity v, slip $\lambda_v$ on the front axle va and slip $\lambda_h$ on the rear axle ha. No lateral-dynamic variables may be used for determining the mean slip on the front and rear axles va, ha, with the exception of the yaw rate.

Optionally, some of the following variables may also be incorporated in an expanded pilot control method:
  longitudinal torque/longitudinal force distribution LMV between front and rear axles, which may particularly be calculated from the longitudinal acceleration and/or the longitudinal slip at the front axle and the rear axle;
  mean wheel slip at front axle va and rear axle ha, these being able to be ascertained, for example, with the aid of the vehicle reference velocity, the four wheel speeds, and the yaw rate;
  mass, yaw moment of inertia, and center of gravity position, fixed values being assumed in a basic form of a method according to the present invention;
  mean slip angle at front and rear axle using a suitable sensor system;
  mean coefficient of friction at front and rear axles using a suitable sensor system; and
  mean slip rigidities at front and rear axles using a suitable observer.

A corresponding signal may be generated or provided for event-discrete startup and/or shutdown of a function consistent with the present invention, e.g., only in case of load change and/or velocity controlled, for example, by the braking system or by an engine control unit. Furthermore, the vehicle reference velocity or the longitudinal acceleration may be used for this purpose, for example. In a basic form of a method consistent with the present invention, a continuous system may be assumed, i.e., a method consistent with the present invention may run continuously both in case of drive and load change and also in case of braking.

Consistent with the present invention, dependency of the intrinsic steering behavior of the vehicle on the longitudinal dynamic is reduced significantly in this case by a model-supported pilot control. Velocity, longitudinal acceleration, drive, braking, and drag force distribution between front and rear axles, longitudinal slip, etc., may be considered as influencing variables of the longitudinal dynamic. The input variables may be obtained from sensor systems already present in the motor vehicle and/or provided by existing or additional observers.

The term stabilization is understood in the scope of the present invention in the meaning from control engineering, which does not mean that a method consistent with the present invention always causes an increase of the stability of the driving properties of the vehicle in principle. Specifically, in case of acceleration, a method consistent with the present invention reduces the stability of the vehicle driving properties by an acceptable amount to increase the agility of the vehicle and thus the driving comfort.

Accordingly, consistent with the present invention, the following advantages may result for a user and/or driver:

Reduction of the yaw interference due to braking, acceleration, load change. Simultaneously, more comfort is offered to a driver by reducing the steering effort: the intrinsic steering behavior of the vehicle changes during acceleration, braking, and load change. The driver must already compensate for this change of the intrinsic steering behavior in the linear range without a device according to the present invention: during acceleration by steering inward, during load changes and/or during braking by opening the steering. This compensation is performed actively by the intervention of a method according to the present invention. The steering effort is reduced for the driver, the vehicle remains more stable overall because of the pilot-control stabilization. Subsequent stabilization interventions of other systems are also possible, but are significantly reduced in these driving situations.

Reduction of engine interventions during load change is: engine interventions are used in a known way, inter alia, for the purpose of reducing the drag torque during load changes by giving gas relatively lightly and with active control, and thus avoiding destabilizing yaw torque. A reduction of the velocity commanded by the driver through gas reduction is restricted. Through the use of a method according to the present invention, the pilot control countersteers during load changes. The engine interventions may be reduced and the vehicle may be decelerated in an improved way according to the driver command.

Reduction of selective, individual wheel pressure modulations by which a compensating yaw torque is applied during braking or acceleration while cornering. A method according to the present invention may assume this stabilization as a pilot control as an alternative or supplement. Since a method according to the present invention acts quasi-continuously, the driver advantageously experiences the support in all braking/drive and load change situations.

There may be two advantageous fields of use result for a single-track model consistent with the present invention having longitudinal dynamic consideration: First, it may be used for reducing/compensating for the longitudinal dynamic influence on the lateral dynamic, as described above. In addition, however, it may also be used for the purpose of not compensating for these deviations, but rather detecting them as vehicle properties, which are to be left untouched intentionally. In the latter case, however, existing systems are already provided beforehand, on the basis of a method according to the present invention and a correspondingly implemented device, with a relatively reliable estimation about vehicle behavior to be immediately expected. In this regard, a setpoint value calculation may be referred to here. This information may then also be used, inter alia, for the purpose of avoiding an imminent instability, preferably in the event a threshold value is exceeded, with predictive use of known stabilization systems.

Other objects, advantages and novel features of the present invention will become apparent from the following detailed description of the invention when considered in conjunction with the accompanying drawings.

DETAILED DESCRIPTION OF THE DRAWINGS

The following description refers to the accompanying drawing. The implementations set forth in the following description do not represent all implementations consistent with the claimed invention. Instead, they are merely some examples of implementations consistent with the invention. Other implementations may be used and structural and procedural changes may be made without departing from the scope of present invention.

Figure 1:
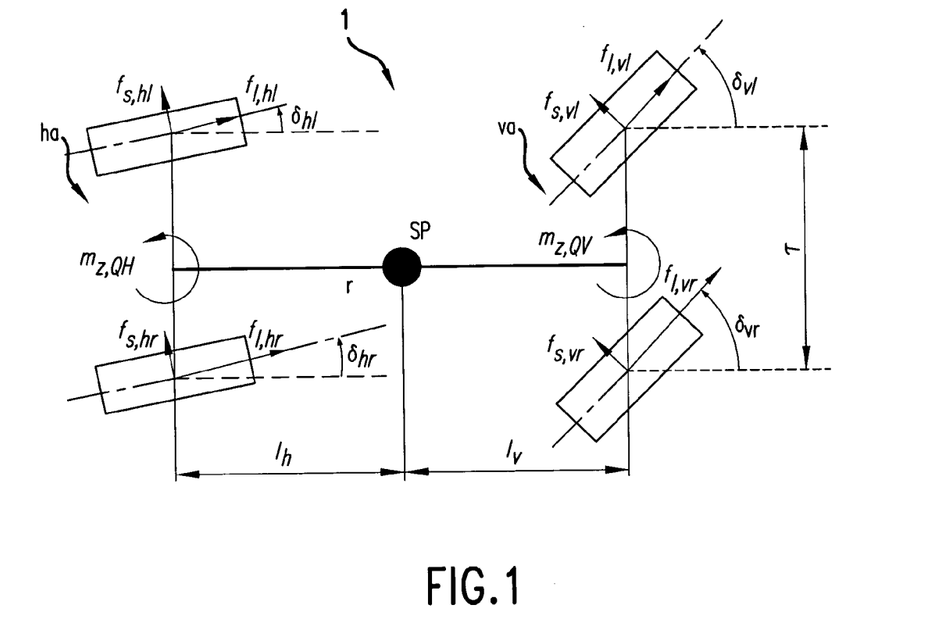
FIG. 1 shows a planar model of a motor vehicle in the form of a simplified dual-track model.

The following is a list of references used throughout the disclosures and figures:

1 motor vehicle
2 single-track model
3 inverse expanded single-track model
4 inverse single-track model
5 startup/shutdown function
6 expanded single-track model having longitudinal dynamic
7 proportional amplification
8 PID regulator
9 feedback loop
10 block having filter function Q
11 block having the product of the filter function Q and inverse transfer function of a single-track model (ESM)
$\beta$ float angle
$\lambda_v, \lambda_h$ longitudinal slip on front axle, rear axle
$\delta_{\mathit{eff}}$ driver command—effective steering angle
$\delta_{h/v}$ steering angle according to ESM
$\delta_{h/vLD}$ steering angle according to ESM considering LD
$\delta_{HL/AL}$ auxiliary steering angle
$a_x$ longitudinal acceleration $a_y$ lateral acceleration
$m_z$ torque around the z axis
$f_s$ lateral force
$f_l$ longitudinal force
$f_x$ force in the direction of the x axis (vehicle longitudinal axis)
$f_y$ force in the direction of the y axis (vehicle lateral axis)
$l_v$ distance of the center of gravity from the front axle
$l_h$ distance of the center of gravity from the rear axle
r yaw rate
$r_{soll}$ setpoint yaw rate
v front axle
h rear axle
SP center of gravity of the vehicle
T track width
AL active front wheel steering
ESM single-track model
HL active rear wheel steering
LD longitudinal dynamics
ha rear axle
va front axle
QH actuators for lateral torque distribution on the rear axle
QV actuators for lateral torque distribution on the front axle
LMV longitudinal torque or longitudinal force distribution
LV actuator for setting a longitudinal torque or longitudinal force distribution
ABC active body control
DD dynamic drive Referring now to the figures, a planar model of a motor vehicle 1 is illustrated in FIG. 1 in the form of a dual-track model. Positioning yaw torques are shown therein, which occur because of asymmetrical drive/load change and/or braking force distribution on the front and rear axles. For the sake of simplicity and ease of explanation, it is assumed here that a rear axle (ha) and a front axle (va) have an equally large track width T and, furthermore, that a center of gravity SP of vehicle 1 lies on the longitudinal axis.

A dual-track model developed on the basis of the illustration of FIG. 1 is disclosed, for example, in DE 40 30 704 A1. It exceeds the single-track model already specified in 1940 by R. Riekert and T. Schunck, op. cit., in regard to its modeling precision for investigating the driving properties of motor vehicles. A faster compensation intervention with acceptable parameterization and/or computing outlay is achievable on the basis of a single-track model. An expanded single-track model according to FIG. 2 may be derived from the dual-track model from FIG. 1.

Figure 2:
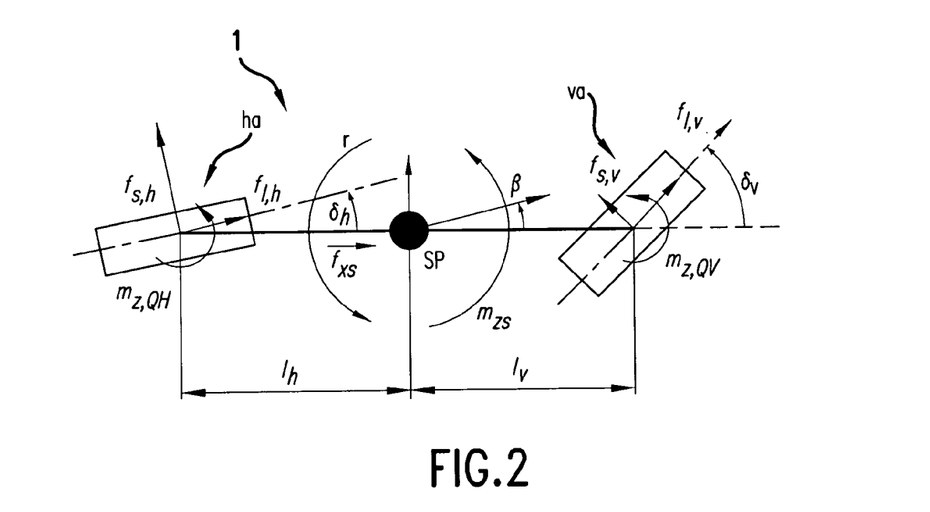
FIG. 2 shows a planar model of a motor vehicle in the form of an expanded single-track model.

In the following description, a model-supported pilot control on the basis of a single-track model is presented with derivation of the mathematical formulas essential for this purpose, which is shown in FIG. 2 having applied forces and torques. As used herein, $f_{s,h/v}$ and $f_{l,v/h}$ identify the particular tire lateral forces and tire longitudinal forces at the front and rear axles, which occur because of the contact between the tires and the roadway. $M_{zs}$, $f_{xs}$, $f_{ys}$ identify externally applied generalized interfering torques and interfering forces. These may be used to represent the influence of lateral wind or μ-split braking on the driving behavior. The applied torques around the z and/or height axis $m_{z,QH}$ and $m_{z,QV}$ are additional yaw torques at the front and/or rear axle, which arise due to asymmetrical driving or braking of the wheels between left and right vehicle halves. This is schematically shown in FIG. 1. Furthermore, it is assumed, for the sake of simplicity and ease of explanation, that the steering angles of the wheels at the front and rear axles $\delta_{vl}=\delta_{vr}=:\delta_v$ and $\delta_{hl}=\delta_{hr}=:\delta_h$ are equally large. With this assumption, the positioning yaw torques due to asymmetrical drive/load change and/or braking force distribution at the front and rear axles (va, ha) are thus specified by:

$$m_{z,QV} = \frac{T}{2}(f_{1,vr} - f_{1,vl})\cos\delta_v = \frac{T}{2}\Delta f_{1,v}\cos\delta_v \quad (1)$$

$$m_{z,QH} = \frac{T}{2}(f_{1,hr} - f_{1,hl})\cos\delta_h = \frac{T}{2}\Delta f_{1,h}\cos\delta_h.$$

The longitudinal, lateral, and yaw dynamics of the single-track model of a motor vehicle having front wheel and rear wheel steering are described by:

$$\begin{bmatrix} mv(\beta+r) \\ m\dot{v} \\ i_z \dot{r} \end{bmatrix} = \begin{bmatrix} -\sin\beta & \cos\beta & 0 \\ \cos\beta & \sin\beta & 0 \\ 0 & 0 & 1 \end{bmatrix} \begin{bmatrix} f_x \\ f_y \\ m_z \end{bmatrix}. \quad (2)$$

For purposes of the above equation, $f_x$, $f_y$, $m_z$ are the applied forces/torques acting on the vehicle in vehicle-fixed coordinates. The following equations apply:

$$\begin{bmatrix} f_x \\ f_y \\ m_z \end{bmatrix} = \begin{bmatrix} -\sin\delta_v & \cos\delta_v & -\sin\delta_h & \cos\delta_h \\ \cos\delta_v & \sin\delta_v & \cos\delta_h & \sin\delta_h \\ l_v\cos\delta_v & l_v\sin\delta_v & -l_h\cos\delta_h & -\sin\delta_h \end{bmatrix} \begin{bmatrix} f_{s,v} \\ f_{l,v} \\ f_{s,h} \\ f_{l,h} \end{bmatrix} + \begin{bmatrix} 0 \\ 0 \\ m_{z,QV} + m_{z,QH} \end{bmatrix} + \begin{bmatrix} f_{xs} \\ f_{ys} \\ m_{zs} \end{bmatrix} \quad (3)$$

or overall:

$$\begin{bmatrix} m\dot{v} \\ mv(\beta+r) \\ i_z\dot{r} \end{bmatrix} = \begin{bmatrix} \sin(\beta-\delta_v) & \cos(\beta-\delta_v) & \sin(\beta-\delta_h) & \cos(\beta-\delta_h) \\ \cos(\beta-\delta_v) & -\sin(\beta-\delta_v) & \cos(\beta-\delta_h) & -\sin(\beta-\delta_h) \\ l_v\cos\delta_v & l_v\sin\delta_v & -l_h\cos\delta_h & -l_h\sin\delta_h \end{bmatrix} \begin{bmatrix} f_{s,v} \\ f_{l,v} \\ f_{s,h} \\ f_{l,h} \end{bmatrix} \begin{bmatrix} 0 \\ 0 \\ m_{z,QV} + m_{z,QH} \end{bmatrix} + \begin{bmatrix} f_{xs} \\ f_{ys} \\ m_{zs} \end{bmatrix} \quad (4)$$

In the above, $f_{s,h/v}$ and $f_{l,v/h}$ are the lateral and longitudinal forces acting on the front and rear wheels. As a simplification, the following relationships may be assumed:

$f_{l,v} = (1-LMV)F_{ges}$ $f_{l,h} = LMV\, F_{ges}$ $f_{s,v} = c_v \alpha_v$ $f_{s,h} = c_h \alpha_h$ \quad (5)

with $F_{ges} = ma_x$.

To use the linear single-track model considering the longitudinal dynamic, it may be necessary to measure or observe the longitudinal acceleration and also to observe a longitudinal torque or longitudinal force distribution (LMV) between front and rear axles. The variable LMV identifies the relationship variable defined as follows:

LMV=(braking/drag/drive torque transmitted to the rear axle)/(total braking/drag/drive torque)

The possibilities for ascertaining the longitudinal acceleration and longitudinal torque or longitudinal force distribution LMV between front and rear axles are explained below. The longitudinal acceleration may be ascertained by, inter alia:

longitudinal acceleration sensors and/or drivetrain model (gas pedal setting, gear, engine speed, engine torque, . . . ) and brake pressure (measured or observed) or driver admission pressure using $c_p$ values (conversion factors of the brake pressure on the individual brakes) and/or differentiation of the vehicle reference velocity, knowledge of individual-wheel wheel speeds, slips, etc. being necessary.

The longitudinal torque or longitudinal force distribution LMV between front and rear axles may be ascertained in various ways. For this purpose, inter alia, it is advisable to differentiate between front wheel drive, rear wheel drive, and all-wheel drive (permanent all wheel, LV) vehicles and between drive, load change, and braking cases (normal, regulated braking) as follows:

|  | Drive/load change case | Braking case |
| --- | --- | --- |
| Rear wheel drive | LMV = 1 | LMV from braking force distribution between front and rear + proportion of engine drag torque on rear axle ha |
| Front wheel drive | LMV = 0 | LMV from braking force distribution between front and rear + proportion of engine drag torque on front axle va |
| All-wheel | LMV corresponding to all-wheel concept permanent all wheel: LMV has fixed value, e.g., LMV = 0.6 (60% on rear axle ha, 40% on front axle va) LV clutch locked clutch slips | LMV from braking force distribution between front and rear + proportion of engine drag torque on front axle va and rear axle ha corresponding to all-wheel concept |

The variable LMV may now be calculated on the basis of the above table or by direct measurement/estimation of the longitudinal forces and/or longitudinal torques on front and rear axles. A preferred embodiment of an LMV estimation, which differs therefrom, is described below.

The relationship for the wheel load changes results simply from the stationary torque equilibrium in the y direction around the wheel contact points at the front and/or rear with stationary acceleration $a_x$=const. and stationary $a_x$=0, neglecting the pitch and lift dynamic with $l=l_v+l_h$ to $0 = m a_x h + m g l_h - F_{zv} l$ $0 = m a_x h - m g l_v + F_{zh} l$ $0 = m g l_h - F_{zv,0} l$ $0 = -m g l_v - F_{zh,0} l$ (6)

The solution of the equation provides:

$$F_{zv} = F_{zv,0}\left(1 - \frac{a_x}{g}\frac{h}{l_h}\right) \quad (7)$$

$$F_{zh} = F_{zh,0}\left(1 + \frac{a_x}{g}\frac{h}{l_v}\right)$$

The following equations apply for the stationary contact forces at the front and rear with $a_x = 0$:

$$F_{zv,0} = \frac{l_h}{l} mg \quad (8)$$

$$F_{zh,0} = \frac{l_v}{l} mg$$

Two cases are now to be differentiated:

(1) For the ideal all-wheel drive (defined for the single-track model by the condition that mean slip $\lambda_v$ on the front axle va and mean slip $\lambda_h$ on the rear axle ha are equally large), the following equation applies for the longitudinal force distribution:

$$LMV_{ID} = \frac{F_{l,h}}{F_{l,v} + F_{l,h}} = \frac{F_{z,h}}{mg} \quad (9)$$

Using (7) and (8), it follows therefrom $$LMV_{ID} = \frac{\left(l_v + \frac{a_x}{g}h\right)}{l} \quad (10)$$

(2) It is generally true for the longitudinal forces that:

$F_{x,v} = \lambda_v c_{x,v} F_{z,v}$ $F_{x,h} = \lambda_h c_{x,h} F_{z,h}$ (11)

The following equation thus applies for LMV:

$$LMV = \frac{F_{x,h}}{F_{x,v} + F_{x,h}} = \frac{\lambda_h c_{x,h} F_{z,h}}{\lambda_v c_{x,v} F_{z,v} + \lambda_h c_{x,h} F_{z,h}} \quad (12)$$

If one assumes homogeneous road conditions and homogeneous longitudinal rigidities $c_x = c_{x,v} = c_{x,h}$ for simplification, it thus follows, under the condition that $\lambda_v$ and $\lambda_h$ may not be zero simultaneously:

$$LMV = \frac{\lambda_h F_{z,h}}{\lambda_v F_{z,v} + \lambda_h F_{z,h}} = \frac{\lambda_h LMV_{ID}}{\lambda_v(1 - LMV_{ID}) + \lambda_h LMV_{ID}}. \quad (13)$$

Using equation (10), it generally follows therefrom:

$$LMV = \frac{(a_x h1^2 + g1_v)\lambda_h}{a_x h1^2(\lambda_h - \lambda_v) + g(1_v\lambda_h + 1_h\lambda_v)}. \quad (14)$$

The longitudinal torque or longitudinal force distribution LMV between front and rear axles may thus be ascertained as a function of the longitudinal acceleration and the mean slip at front and rear axles (va, ha). In rear-wheel drive vehicles, in case of drive and drag, $\lambda_v=0$ approximately and therefore LMV=1. In front wheel drive vehicles, $\lambda_h=0$ approximately and therefore LMV=0 in case of drive and drag. With ideal all-wheel drive, $\lambda_v=\lambda_h$ and therefore LMV=LMV$_{ID}$. This value also approximately results in vehicles having LV and closed clutch ($\lambda_v$ and $\lambda_h$ are approximately, but not exactly equal). In case of braking, a value corresponding to the design of the brakes results independently of the type of drive (under the condition that there are no copier effects via the drivetrain). The influence of pitch and lift dynamics on lateral and yaw dynamics were neglected in the above equations. These effects may be taken into consideration, however, by upstream dynamic filtering of the longitudinal acceleration signal $a_x$, for example, by PT$_2$ filtering.

Figure 3A:
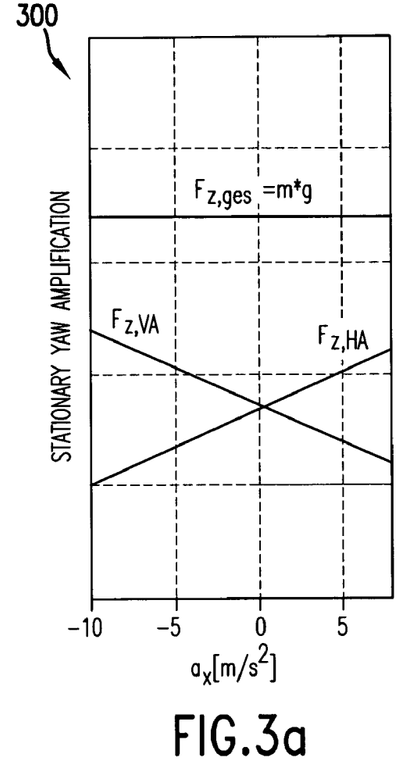
FIGS. 3a and 3b are diagrams that illustrate a distribution of wheel contact forces and longitudinal torque or longitudinal force distribution LMV between front and rear axles during ideal all-wheel operation over the longitudinal acceleration.
Figure 3B:
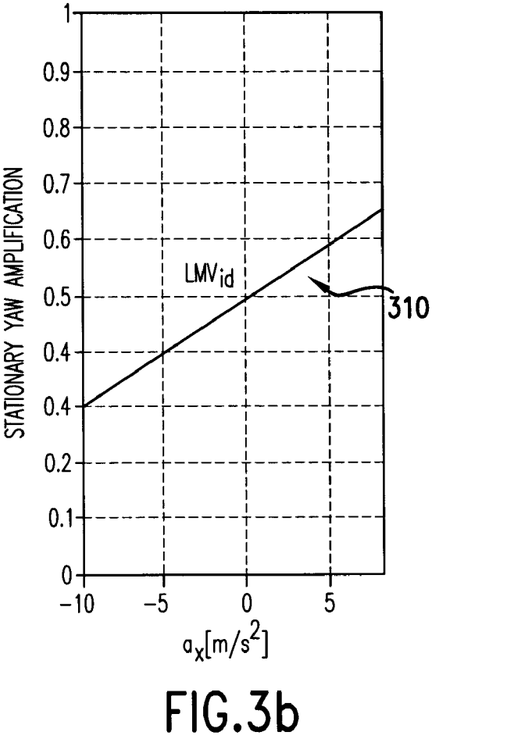

FIG. 3a shows a diagram that illustrates a distribution 300 of wheel contact forces over the longitudinal acceleration $a_x$. The wheel contact forces are distributed in accordance with the weight distribution on both axles at a longitudinal acceleration $a_x=0$. The influence of the pitch and lift dynamics on the lateral and yaw dynamics is neglected in the further derivation of the equations mathematically describing the states for simplification. A longitudinal torque or longitudinal force distribution LMV$_{id}$ (310) between front and rear axles in the ideal all-wheel drive operation is shown in FIG. 3b over the longitudinal acceleration $a_x$.

Figure 4:
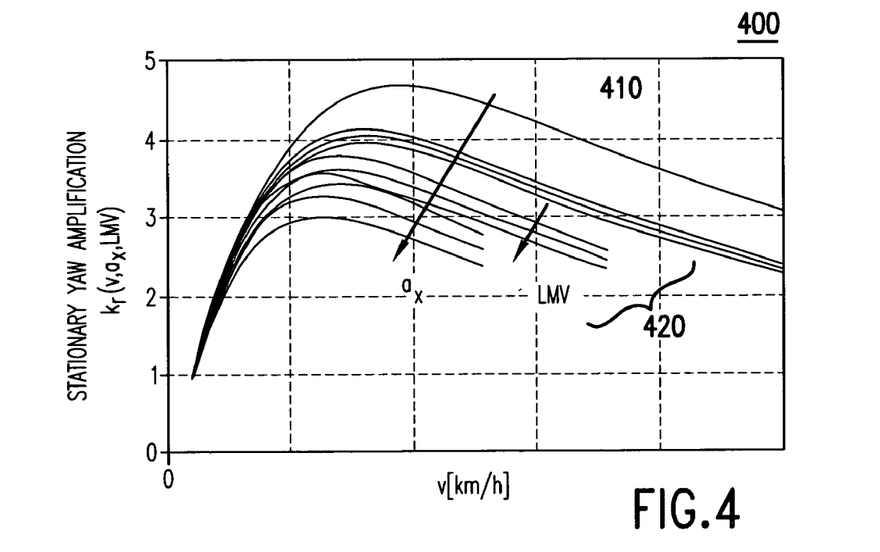
FIG. 4 is a diagram that illustrates a distribution of the stationary yaw amplification over the velocity as a function of longitudinal acceleration and torque distribution according to the expanded single-track model at various parameter values.

FIG. 4 shows a diagram that illustrates a distribution 400 of the stationary yaw amplification over the velocity as a function of longitudinal acceleration and torque distribution according to various model approaches as a further investigation prior to modeling. The uppermost line 410 shows a result obtained according to the uncorrected single-track model. The further lines 420 show the influence of longitudinal acceleration $a_x$ and longitudinal torque or longitudinal force distribution LMV as the parameters characterizing the longitudinal dynamic on the steering behavior over four sizes of the longitudinal acceleration $a_x$ and three sizes of the longitudinal force distribution LMV (LMV=0, 0.5, 1).

The following assumptions are made for linearization of the status equations:

- The wheels on the left and right in front and on the left and right in rear are each combined. A single-track model is thus used as the basis.
- The longitudinal dynamics having the parameters v, $a_x$, and LMV are assumed as slow in relation to the lateral and yaw dynamics for the model calculation. Under this condition, the parameters v, $a_x$, LMV may be observed as varying parameters in the simplified model and do not have to be controlled as states.
- The influence of the wheel slip on the slip angle rigidities is not considered in a simple approach.

Furthermore, it is assumed that the slip angle rigidities are a function of the wheel load changes according to a defined relationship.

Linearization of the equation system according to equation (4) by linear travel at constant travel velocity, longitudinal acceleration, and longitudinal torque distribution results in:

$$\begin{bmatrix} m\dot{v} \\ mv(\dot{\beta}+r) \\ i_z\dot{r} \end{bmatrix} = \begin{bmatrix} \beta-\delta_v & 1 & \beta-\delta_h & 1 \\ 1 & \delta_v-\beta & 1 & \delta_h-\beta \\ 1_v & 1_v\delta & -1_h & -1_h\delta_h \end{bmatrix} \begin{bmatrix} f_{s,v} \\ f_{1,v} \\ f_{s,h} \\ f_{1,h} \end{bmatrix} + \begin{bmatrix} 0 \\ 0 \\ m_{z,QV}+m_{z,QH} \end{bmatrix} + \begin{bmatrix} f_{x,s} \\ f_{y,s} \\ m_{z,s} \end{bmatrix} \quad (15)$$

having the linearized longitudinal and lateral forces $$f_{1,v} = (1-LMV)F_{ges} \quad (16)$$
$$f_{1,h} = LMV F_{ges}$$
$$f_{s,v} = c_v\left(\delta_v - \beta - \frac{1_v r}{v}\right)$$
$$f_{s,h} = c_h\left(\delta_h - \beta + \frac{1_h r}{v}\right)$$

Furthermore, it is assumed that the slip angle rigidities are a function of the wheel load changes according to the linear relationship:

$$c_v = k_{v,F_z} c_{v,0} \quad (17)$$
$$c_h = k_{h,F_z} c_{h,0}$$
$$k_{v,F_z} = \frac{F_{zv}}{F_{zv,0}}$$
$$k_{h,F_x} = \frac{F_{gh}}{F_{zh,0}}$$

Instead of the linear relationship between slip angle rigidities and wheel load changes, a characteristic curve may be used. Such a characteristic curve may be ascertained in a driving experiment or generated, for example, from measured tire data. The use of a nonlinear tire model may also be helpful for this purpose, such as Pacejkas Magic Formula.

The relationship for the wheel load changes results in simplified form from the stationary torque equilibrium in the y direction around the wheel contact points at the front and/or rear, neglecting the pitch and lift dynamic, see equations (6) and (7). The slip angle rigidities are thus defined as:

$$c_v = c_{v,0}\left(1 - \frac{a_x}{g}\frac{h}{1_h}\right) \quad (18)$$
$$c_h = c_{h,0}\left(1 + \frac{a_x}{g}\frac{h}{1_v}\right)$$

In addition to the influence of the wheel contact forces, it may be advisable to consider the slip dependence of the slip angle rigidities:

$$c_v = k_{v,\lambda} k_{v,F_z} c_{v,0}$$

$$c_h = k_{h,\lambda} k_{h,F_z} c_{h,0} \quad (19)$$

Figure 5:
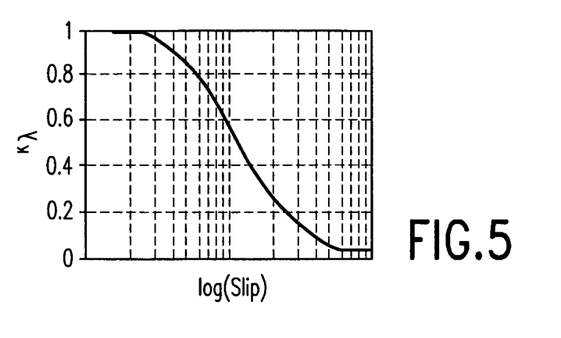
FIG. 5 shows a characteristic curve to determine a factor of the slip angle rigidity dependent on velocity and slip.

Corresponding characteristic curves may also be ascertained for this purpose by tire models and/or in a driving experiment, see, for example, the illustration of FIG. 5. Additional signals are then to consider the particular mean slip $\lambda_v$, $\lambda_h$ at front and rear axles va, ha.

The above assumptions for calculating the slip angle rigidities are based on quasi-stationary observations. The dynamic influences of the lift, pitch, and roll dynamics were neglected for this purpose. These effects may be considered in a more detailed approach for calculating the slip angle rigidities, as may the above-mentioned expansions of the mathematical model.

Assuming that the longitudinal dynamic is slow in relation to the lateral and yaw dynamics, the following state space representation results:

$$\begin{bmatrix} \dot{\beta} \\ \dot{r} \end{bmatrix} = \begin{bmatrix} -\dfrac{c_h + c_v + F_{ges}}{mv} & \dfrac{c_h l_h - c_v l_v}{mv^2} - 1 \\ \dfrac{c_h l_h - c_v l_v}{i_z} & -\dfrac{c_h l_h^2 + c_v l_v^2}{i_z v} \end{bmatrix} \begin{bmatrix} \beta \\ r \end{bmatrix} + \quad (20)$$

$$\begin{bmatrix} \dfrac{c_v + F_{1,v}}{mv} & \dfrac{c_h + F_{1,h}}{mv} \\ \dfrac{(c_v + F_{1,v})l_v}{i_z} & -\dfrac{l_h(c_h + F_{1,h})}{i_z} \end{bmatrix} \begin{bmatrix} \delta_v \\ \delta_h \end{bmatrix} + \begin{bmatrix} 0 & 0 \\ \dfrac{1}{i_z} & \dfrac{1}{i_z} \end{bmatrix} \begin{bmatrix} m_{z,QV} \\ m_{z,QH} \end{bmatrix} +$$

$$\begin{bmatrix} \dfrac{1}{mv} & 0 \\ 0 & \dfrac{1}{i_z} \end{bmatrix} \begin{bmatrix} f_{y,s} \\ m_{z,s} \end{bmatrix}$$

or $$\begin{bmatrix} \dot{\beta} \\ \dot{r} \end{bmatrix} = \begin{bmatrix} -\dfrac{c_h + c_v + F_{ges}}{mv} & \dfrac{c_h l_h - c_v l_v}{mv^2} - 1 \\ \dfrac{c_h l_h - c_v l_v}{i_z} & -\dfrac{c_h l_h^2 + c_v l_v^2}{i_z v} \end{bmatrix} \begin{bmatrix} \beta \\ r \end{bmatrix} + \quad (21)$$

$$\begin{bmatrix} \dfrac{c_v + F_{ges}(1 - LMV)}{mv} & \dfrac{c_h + F_{ges}LMV}{mv} \\ \dfrac{(c_v + F_{ges}(1 - LMV))l_v}{i_z} & -\dfrac{l_h(c_h + F_{ges}LMV)}{i_z} \end{bmatrix} \begin{bmatrix} \delta_v \\ \delta_h \end{bmatrix} +$$

$$\begin{bmatrix} 0 & 0 \\ \dfrac{1}{i_z} & \dfrac{1}{i_z} \end{bmatrix} \begin{bmatrix} m_{z,QV} \\ m_{z,QH} \end{bmatrix} + \begin{bmatrix} \dfrac{1}{mv} & 0 \\ 0 & \dfrac{1}{i_z} \end{bmatrix} \begin{bmatrix} f_{y,s} \\ m_{z,s} \end{bmatrix}$$

The latter assumption means that the longitudinal dynamics may be decoupled from the lateral and yaw dynamics. The consideration of the differential equations may thus be dispensed with for the longitudinal dynamics. The longitudinal-dynamic variables v, $a_x$, and LMV are interpreted in the following as varying, slowly changing parameters. The single-track model having longitudinal dynamic may thus be viewed as a parametric linear time-invariant system, i.e., as a parametric LTI system, as a linear parameter varying (LPV) system, or as a system having varying parameters.

It is should be noted that the latter assumption may not be suitable for precise observation, since the longitudinal dynamics may change very rapidly on the acceleration level in particular and this has influence on lateral and yaw dynamics. The assumption is used here as a simplification, however, to derive the simplest possible model. The transient influence of the longitudinal dynamic change on the lateral and yaw dynamics must therefore be investigated using a completely nonlinear (simulation) model and/or on the basis of driving experiments to ensure the reliability of the simplifications performed.

Overall, the following equations result in the state space:

$$\begin{bmatrix} \dot{\beta} \\ \dot{r} \end{bmatrix} = \begin{bmatrix} a_{11} & a_{12} \\ a_{21} & a_{22} \end{bmatrix} \begin{bmatrix} \beta \\ r \end{bmatrix} + \begin{bmatrix} b_{11} & b_{12} \\ b_{21} & b_{22} \end{bmatrix} \begin{bmatrix} \delta_v \\ \delta_h \end{bmatrix} + \quad (22)$$

$$\begin{bmatrix} 0 & 0 \\ \dfrac{1}{i_z} & \dfrac{1}{i_z} \end{bmatrix} \begin{bmatrix} m_{z,QV} \\ m_{z,QH} \end{bmatrix} + \begin{bmatrix} \dfrac{1}{mv} & 0 \\ 0 & \dfrac{1}{i_z} \end{bmatrix} \begin{bmatrix} f_{y,s} \\ m_{z,s} \end{bmatrix}$$

with $$A = \begin{bmatrix} a_{11} & a_{12} \\ a_{21} & a_{22} \end{bmatrix}, \quad B_\delta = \begin{bmatrix} b_{11} & b_{12} \\ b_{21} & b_{22} \end{bmatrix}, \quad (23)$$

$$B_{QMV} = \begin{bmatrix} 0 & 0 \\ \dfrac{1}{i_z} & \dfrac{1}{i_z} \end{bmatrix}, \quad B_S = \begin{bmatrix} \dfrac{1}{mv} & 0 \\ 0 & \dfrac{1}{i_z} \end{bmatrix}$$

and $$a_{11} = -\frac{(c_{h0} + c_{v0})gl_h l_v + a_x(h(c_{h0}l_h - c_{v0}l_v) + mgl_h l_v)}{mgl_h l_v v}$$

$$a_{12} = \frac{gl_h l_v(c_{h0}l_h - c_{v0}l_v) + a_x h(c_{h0}l_h^2 + c_{v0}l_v^2)}{mgl_h l_v v^2} - 1$$

$$a_{21} = \frac{gl_h l_v(c_{h0}l_h - c_{v0}l_v) + a_x h(c_{h0}l_h^2 + c_{v0}l_v^2)}{i_z g l_h l_v}$$

$$a_{22} = \frac{a_x h(c_{v0}l_v^3 - c_{h0}l_h^3) - gl_h l_v(c_{h0}l_h^2 + c_{v0}l_v^2)}{i_z g l_h l_v v}$$

$$b_{11} = \frac{c_{v0}gl_h - a_x(c_{v0}h + mgl_h(LMV - 1))}{mgl_h v}$$

$$b_{12} = \frac{c_{h0}gl_v + a_x(c_{h0}h + mgl_h LMV)}{mgl_v v}$$

$$b_{21} = \frac{l_v(c_{v0}gl_h - a_x(c_{v0}h + mgl_h(LMV - 1)))}{gl_h i_z}$$

$$b_{22} = -\frac{l_h(c_{h0}gl_v + a_x(c_{h0}h + mgl_v LMV))}{gl_v i_z}$$

The system matrix, i.e., $\alpha_{ij}$ in this model and thus the system poles, is not a function of the longitudinal torque distribution LMV, but rather of the overall converted drive force $F_{ges}$=m $a_x$, as well as the changes of the slip angle rigidities as a function of the wheel load change and/or the slip.

Linear model equations are specified in transfer form below. Linear transfer functions may be derived correspondingly for the float angle and the yaw rate from the state space representation in equation (22). The characteristic polynomial is as follows:

$$p(s) = \det(sI - A) \quad (24)$$

$$= i_z \cdot s \cdot v \cdot (F_{ges} + m \cdot s \cdot v) + c_v \cdot$$

$$(i_z \cdot s \cdot v + 1_v \cdot (F_{ges} \cdot 1_v + m \cdot (1_v \cdot s - v) \cdot v)) +$$

$$c_h \cdot (c_v \cdot 1^2 + i_z \cdot s \cdot v + 1_h \cdot (F_{ges} \cdot 1_h + m \cdot v \cdot (1_h \cdot s + v)))$$

The transfer functions of front wheel steering angle, rear wheel steering angle, and yaw torque to yaw rate are:

$$G_{rv}(s) = \frac{r}{\delta_v} \tag{25}$$
$$= \frac{(c_v + F_{ges}(1 - LMV)) \cdot v \cdot (c_h \cdot 1 + 1_v \cdot (F_{ges} + m \cdot s \cdot v))}{p(s)}$$

$$G_{rh}(s) = \frac{r}{\delta_h} \tag{26}$$
$$= \frac{-((c_h + F_{ges} \cdot LMV) \cdot v \cdot (c_v \cdot 1 + 1_v \cdot (F_{ges} + m \cdot s \cdot v)))}{p(s)}$$

$$G_{rmz}(s) = \frac{r}{m_{z,S}} \tag{27}$$
$$= \frac{r}{m_{z,QV}}$$
$$= \frac{r}{m_{z,QH}}$$
$$= \frac{v \cdot (c_h + c_v + F_{ges} + m \cdot s \cdot v)}{p(s)}$$

The transfer functions of the typical linear single-track model, i.e., the single-track model without longitudinal dynamic, which is identified by a zero in the index, result from the above equations by setting $a_x$ to zero. This is equivalent to $F_{ges}=0$ and $c_v=c_{v0}$, $c_h=c_{h0}$, i.e., $$G_{rv0}(s,v) = G_{rv}(s,v,a_x=0) \tag{25a}$$

The stationary amplification factors reflect the stationary relationships between input and/or interference variables (steering angle, yaw interference torque, etc.) and vehicle dynamic variables. These factors may be derived from the above equations (24)-(27) by setting the Laplace operator to zero (s=0):

$$p(0) = c_v 1_v (F_{ges} 1_v - mv^2) + c_h (c_v 1^2 + 1_h (F_{ges} 1_h + mv^2)) \tag{28}$$

$$k_{rv} := G_{rv,ss} = \left.\frac{r}{\delta_v}\right|_{ss} = \frac{(c_v + F_{ges}(1 - LMV))(F_{ges} 1_v + c_h 1)v}{p(0)} \tag{29}$$

$$k_{rh} := G_{rh,ss} = \left.\frac{r}{\delta_h}\right|_{ss} = -\frac{(c_h + F_{ges} LMV)(F_{ges} 1_h + c_v 1)v}{p(0)} \tag{30}$$

$$k_{rmz} := G_{rmz,ss} = \left.\frac{r}{m_{z,QV/QH}}\right|_{ss} = \frac{(c_v + c_h + F_{ges} 1)v}{p(0)}$$

For $\alpha_x=0$, s=0, the amplification factors of the conventional single-track model result:

$$k_{rv0} := G_{rv0,ss} = \left.\frac{r}{\delta_v}\right|_{ss} = \frac{c_v c_h 1 v}{c_h c_v 1^2 + (c_h 1_h - c_v 1_v) mv^2}$$

$$k_{rh0} := G_{rh0,ss} = \left.\frac{r}{\delta_h}\right|_{ss} = \frac{c_h c_v 1 v}{c_h c_v 1^2 + (c_h 1_h - c_v 1_v) mv^2} = -k_{rv0}$$

$$k_{rmz0} := G_{rmz0,ss} = \left.\frac{r}{m_{z,QV/QH}}\right|_{ss} = \frac{(c_v + c_h)v}{c_h c_v 1^2 + (c_h 1_h - c_v 1_v) mv^2}$$

Figure 6:
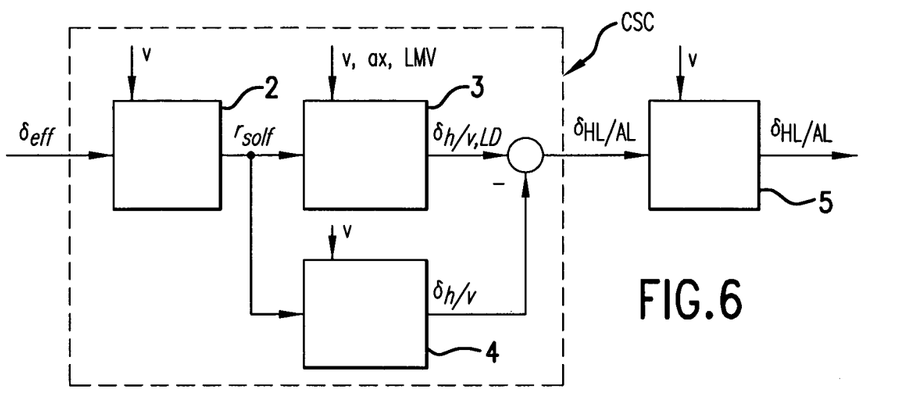
FIG. 6 shows a block diagram to determine a lateral/yaw dynamics decoupled from the longitudinal dynamics.

The decoupling of the lateral and yaw dynamics from the longitudinal dynamic is implemented according to the present invention by a model-supported pilot control, whose mathematical basis is specified above in connection with equation (21). FIG. 6 shows one possible structure for an implementation having active front wheel steering AL and/or active rear wheel steering HL.

As illustrated in FIG. 6, a desired setpoint yaw rate $r_{soll}$ is calculated from a current velocity v and an effective steering angle $\delta_{eff}$, e.g., a steering angle predefined by the driver, as input signals, which originate from a typical single-track model 2 independently of a longitudinal acceleration. The use of stationary values and not the ESM itself is an advantageous feature in this case. The use of a separate yaw rate signal and/or lateral acceleration signal may thus advantageously be dispensed with in the selected approach.

The term model-supported pilot control and/or stabilization function may be understood in more detail as a function based on two vehicle models: a typical single-track model; and a single-track model considering longitudinal dynamics. The output of the function is used to generate an auxiliary yaw torque by at least one actuator, which is responsible for active front wheel steering AL, active rear wheel steering HL, active lateral torque distribution on the front axle QV, and/or active lateral torque distribution on the rear axle QH. With the aid of the deviations of the two single-track models from one another if $a_x \neq 0$, the auxiliary yaw torque is calculated in the form of an auxiliary steering angle (AL, HL) and/or auxiliary wheel differential torque (QV, QH). Driver presets (in the form of steering angle, gas pedal setting, and/or brake pressure), as well as longitudinal-dynamic vehicle variables (in the form of longitudinal acceleration $a_x$, velocity v, slip $\lambda_v$ on the front axle va and slip $\lambda_h$ on the rear axle ha) and/or braking and drive torques may be used exclusively here. Lateral-dynamic variables may thus not be used, with the exception of the yaw rate for determining the mean slip on front and rear axles va, ha.

Independently of a particular internal regulator structure, on the basis of at least three input variables, an actuator control variable is output via a computer program loaded on a data processing system, etc., which is directed to the available actuators by the stabilization systems depending on the application. In principle, it is also possible (according to the approach specified in mathematical detail above and the model used as a basis) to provide multiple output signals for various actuators. In the present exemplary embodiment, however, only an active front wheel steering AL having its actuator may be activated via a setpoint variable $\delta_{HL/AL}$.

Referring to FIG. 6, two steering angles $\delta_{h/v,LD}$ and $\delta_{h/v}$ may be calculated from $r_{soll}$ in a second step. These angles may be calculated via an inverse expanded single-track model 3 using longitudinal dynamics (to which the longitudinal acceleration $a_x$ is supplied as an additional input value) and via an inverse simple single-track model 4. As illustrated, in addition to the current velocity v, the longitudinal acceleration $a_x$ and the longitudinal torque or longitudinal force distribution LMV may also be input into this calculation. The longitudinal torque or longitudinal force distribution LMV may be calculated from the longitudinal acceleration $a_x$ and values for the slip $\lambda_v, \lambda_h$ at front and rear axles va, ha.

The difference of the two steering angles $\delta_{h/v,LD}$ and $\delta_{h/v}$ is used as the setpoint variable $\delta_{HL/AL}$ for an actuator 5 at the front axle va or the rear axle ha as a function of whether an implementation having active front wheel steering AL or active rear wheel steering HL is provided. In each of the cited applications, the setpoint variable $\delta_{HL/AL}$, superimposed on the steering angle $\delta_{eff}$ predefined by the driver, is predefined to a corresponding front wheel and/or rear wheel actuator, depending on whether active front wheel and/or active rear wheel steering is implemented. If only a known front wheel steering is used, the structure may be significantly simplified in that a sequential application of the typical single-track model 2 and the inverse single-track model 4 may be dispensed with. In this case, $\delta_{h/v} = \delta_{\mathit{eff}}$ may therefore be set directly at the summation point terminating the structure, block 4 having the inverse single-track model being dispensed with.

Implementation of stabilization according to the method described above using QV and/or QH actuators may be performed analogously.

In the case of active front wheel steering, the transfer functions between front wheel steering angle and yaw rate corresponding to equation (25a) $G_{rv0}$ (s, v) may be used for the single-track model and/or inverse single-track model. The transfer function between front wheel steering angle and yaw rate considering the longitudinal dynamic $G_{rv}$ (s, v, $a_x$, LMV) corresponding to equation (25) may be used for the single-track model having longitudinal dynamics.

Correspondingly, in case of active rear wheel steering, the transfer functions between rear wheel steering angle and yaw rate without and/or with longitudinal dynamics $G_{rh0}$(s, v), $G_{rh}$ (s, v, $a_x$, LMV) may be used. The definition and derivation of the relevant transfer functions and their stationary values were discussed above in connection with equations (24)-(34).

The AL or HL auxiliary steering angle required for decoupling the lateral dynamic from the longitudinal dynamic may then be calculated as:

$$\delta_{AL} = \left(\frac{G_{rv0}(s, v)}{G_{rv}(s, v, a_x, LMV)} - 1\right)\delta_{\mathit{eff}} \quad (35)$$

and/or $$\delta_{HL} = \left(\frac{G_{rv0}(s, v)}{G_{rh}(s, v, a_x, LMV)} - \frac{G_{rv0}(s, v)}{G_{rh0}(s, v)}\right)\delta_{\mathit{eff}} \quad (36)$$

Instead of the transfer functions, it may be advantageous to use the particular stationary amplification factors corresponding to equations (28)-(34). The setpoint value for the AL or HL actuator then results as:

$$\delta_{AL} = \left(\frac{k_{rv0}(v)}{k_{rv}(v, a_x, LMV)} - 1\right)\delta_{\mathit{eff}} \quad (37)$$

and/or $$\delta_{HL} = -\left(\frac{k_{rh0}(v)}{k_{rh}(v, a_x, LMV)} - 1\right)\delta_{\mathit{eff}} \quad (38)$$

Four implementations may be possible consistent with the structure specified in FIG. 6: dynamic and static cases for active front wheel steering (AL) and dynamic and static cases for active rear wheel steering (HL). These cases are shown in tabular summary below:

|  | Single-track model | Inverse single-track model having longitudinal dynamics | Inverse single-track model | Single-track model having longitudinal dynamics |
|---|---|---|---|---|
| AL dynamic | $G_{rv0}$ (s, v) | $\dfrac{1}{G_{rv}(s, v, a_x, LMV)}$ | $\dfrac{1}{G_{rh0}(s, v)}$ | $G_{rv}$ (s, v, $a_x$, LMV) |
| AL static | $k_{rv0}$ (s, v) | $\dfrac{1}{k_{rv}(s, v, a_x, LMV)}$ | $\dfrac{1}{k_{rv0}(s, v)}$ | $k_{rv}$ (s, v, $a_x$, LMV) |
| HL dynamic | $G_{rv0}$ (s, v) | $\dfrac{1}{G_{rh}(s, v, a_x, LMV)}$ | $\dfrac{1}{G_{rh0}(s, v)}$ | $G_{rv}$ (s, v, $a_x$, LMV) |
| HL static | $k_{rv0}$ (s, v) | $\dfrac{1}{k_{rh}(s, v, a_x, LMV)}$ | $\dfrac{1}{k_{rh0}(s, v)}$ | $k_{rv}$ (s, v, $a_x$, LMV) |

The pilot control intervention may be performed continuously or also situation-dependent, as indicated in the illustration of FIG. 6 by a velocity-dependent startup/shutdown function in block 5. In particular, the model-controlled pilot control may be activated after a load change situation has been recognized.

An analogous implementation using actuators for lateral torque distribution on front and/or rear axle, QV and/or QH actuators is not shown further. For this purpose, yaw torques are derived from $r_{soll}$, which are converted to a corresponding torque $M_{zQV/QH}$ to be set by QH/QV actuators.

Figure 7:
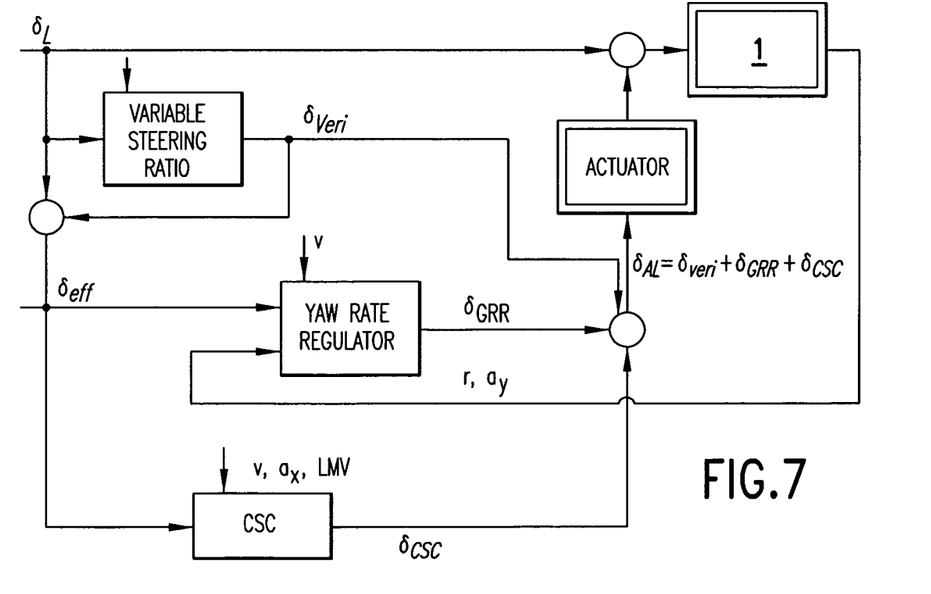
FIG. 7 is a block diagram that illustrates a possibility of integration of a device consistent with the present invention in a system according to the prior art.

In addition, it is advisable to operate the pilot controls described above jointly with a yaw rate regulator. For this purpose, FIG. 7 shows a block diagram to illustrate an exemplary possibility of integration of a device according to FIG. 6 in a system according to the prior art, which provides integration of the longitudinal dynamic compensation implemented using active steering AL (CSC:=cornering steering control), AL yaw rate regulation, and a variable steering ratio. With variable steering ratio, the effective steering angle $\delta_{\mathit{eff}} = \delta_L + \delta_{vari}$ results, otherwise $\delta_{\mathit{eff}} = \delta_L$, i.e., the effective steering angle $\delta_{\mathit{eff}}$ to be implemented corresponds to the driver steering angle $\delta_L$.

Moreover, it is to be noted that active front wheel steering AL and active rear wheel steering HL may also be technically implemented using a steer by wire approach.

Figure 8:
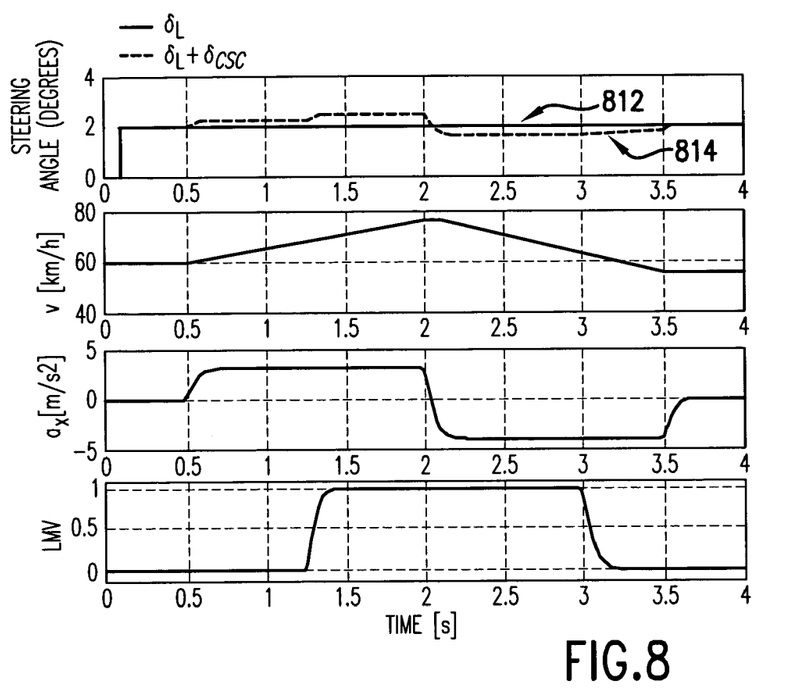
FIG. 8 shows diagrams having simulation results of the linear single-track model with and without longitudinal dynamics in comparison over three usage variations.
Figure 9:
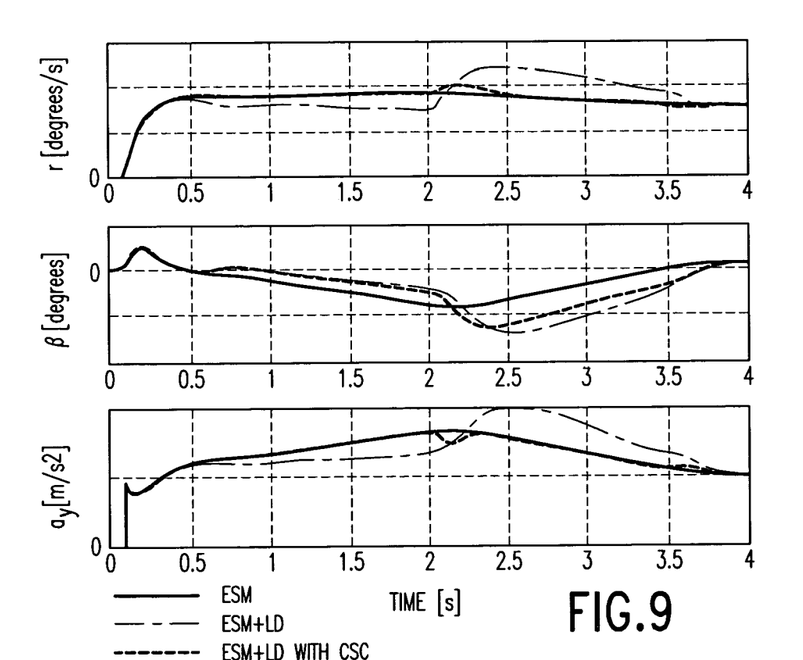
FIG. 9 shows diagrams having simulation results of the essential vehicle-dynamic variables of yaw rate, float angle, and lateral acceleration for the three variations of FIG. 8.

The diagrams of FIG. 8 and FIG. 9 show simulation results using the linear single-track model ESM with and without longitudinal dynamic LD in direct comparison. Three variations are compared:
1. Linear ESM without longitudinal dynamic
2. Linear ESM with longitudinal dynamic LD
3. Linear ESM with longitudinal dynamic LD and longitudinal dynamic compensation.

A driver presets a steering wheel angle jump after 0.1 s. After 0.5 s, acceleration is performed at $a_x > 0$ m/s² and after 2 s, a load change is initiated at $a_x > 0$ m/s². Furthermore, the drive/braking force is distributed between front and rear axles. At the beginning, i.e., between 0 s<t<1.25 s, and at the end at t>3 s, the total drive force is transmitted via the front wheels. Therefore, LMV=0 for the longitudinal torque or longitudinal force distribution here. In the time period 1.5 s<t<3 s, the driver braking force is transmitted via the rear axle, so that LMV=1.

FIG. 8 shows the time curve of the variables, which are essential for the definition of the driving maneuver, of steering angle $\delta_L$, velocity v, longitudinal acceleration $a_x$, and longitudinal torque or longitudinal force distribution LMV. In the uppermost diagram 810, the curve 812 of the steering angle $\delta_L$, which would result purely according to the single-track model, is contrasted with the curve 814 of the steering angle $\delta_L + \delta_{CSC}$ calculated according to a model according to the present invention.

FIG. 9 shows the essential vehicle-dynamic variables of yaw rate r, float angle β, and lateral acceleration $a_y$ for the following three variations:
1. Single-track model ESM
2. Single-track model considering the influence of the longitudinal dynamics on the lateral dynamics ESM+ LD, and
3. Single-track model considering the lateral-dynamic influence using a compensation of this influence according to the present invention ESM+LD with CSC.

The influence of the longitudinal dynamics LD on the curve of yaw rate r, float angle β, and lateral acceleration $a_y$ is recognizable. The influence of the longitudinal dynamics LD on the yaw rate may be compensated by the AL compensation, as shown in FIG. 8, by approximating the compensated regulating curve to the curve according to the pure single-track model. The yaw rate curve is thus essentially adapted to that of the linear single-track model by the pilot control intervention, i.e., the influences of the longitudinal dynamics on the lateral dynamics which also actually exist are essentially compensated for.

Figure 10:
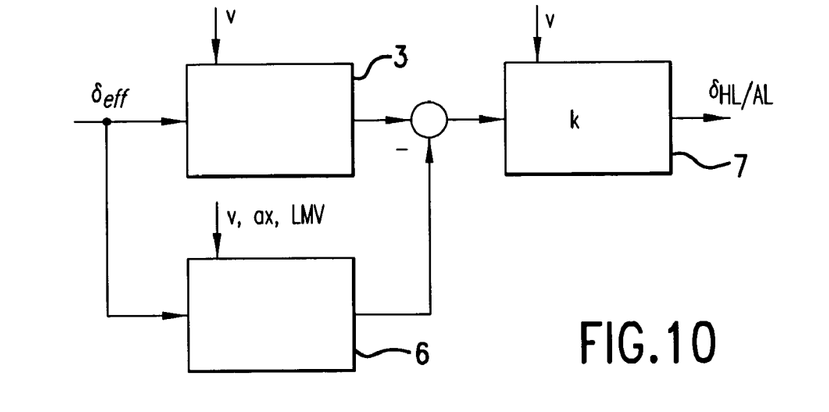
FIG. 10 is a block diagram of a further system for determining lateral/yaw dynamics, decoupled from the longitudinal dynamics, as a model-supported pilot control having proportional amplification.
Figure 11:
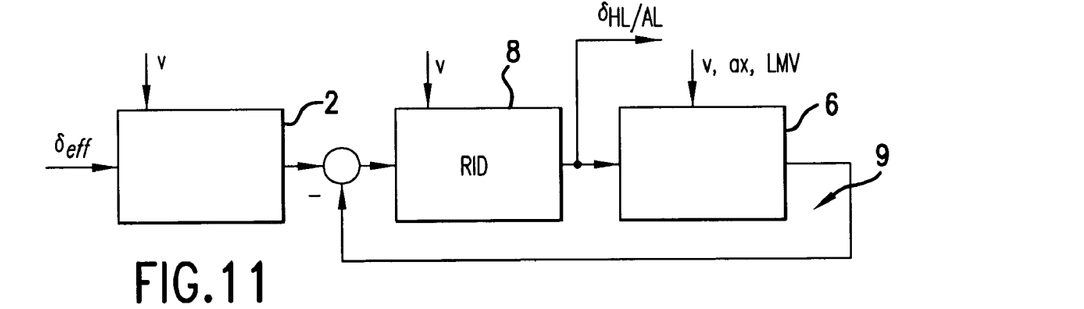
FIG. 11 is a block diagram of a further system for determining lateral/yaw dynamics, decoupled from the longitudinal dynamics, as a regulated pilot control.
Figure 12:
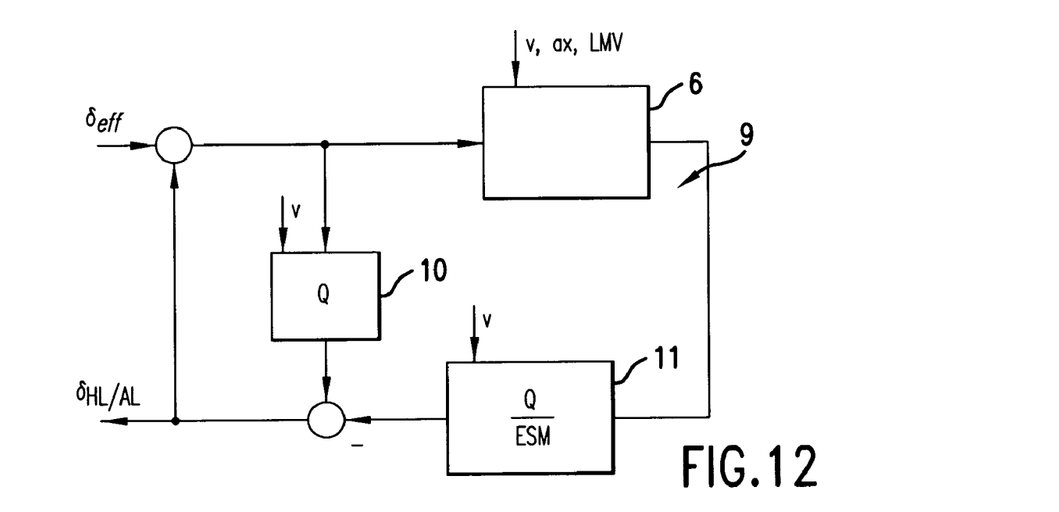
FIG. 12 is a block diagram of a further system for determining lateral/yaw dynamics, decoupled from the longitudinal dynamic, in the form of a structure having two degrees of freedom.

Further structures for implementing a method consistent with the present invention are shown in FIGS. 10-12. In these figures, a velocity-dependent implementation of a particular function is indicated by the additional input signal v on the relevant function blocks.

FIG. 10 shows a block diagram of a system for determining a lateral/yaw dynamics decoupled from the longitudinal dynamics as a model-supported pilot control having proportional amplification. This illustrated system may be an alternative to the implementation described in connection with FIG. 6.

As illustrated in FIG. 10, an effective steering angle $\delta_{eff}$, e.g., a steering angle predefined by the driver, is supplied as an input signal to a typical single-track model 2 and an expanded single-track model having longitudinal dynamics 6. The longitudinal acceleration $a_x$ and the longitudinal torque or longitudinal force distribution LMV may be provided to the model 6 in addition to the velocity v as additional input values. A differential signal which results from the output signals of blocks 2 and 6 is subjected to a proportional or PID amplification as a function of the velocity v in block 7. The signal is output as a modified steering angle preset $\delta_{HL/AL}$ to corresponding actuators.

FIG. 11 shows a block diagram of another system for determining lateral/yaw dynamics decoupled from the longitudinal dynamics as a regulated pilot control, which may be an alternative to the embodiments of FIGS. 6 and 10. This is a regulated pilot control that follows the application of a single-track model in block 2 with the PID regulator in block 8 and block 6 with the single-track model having longitudinal dynamic in a feedback loop 9. The output signal to be output to corresponding actuators as the modified steering angle preset $\delta_{HL/AL}$ is coupled out of the feedback loop 9 between the PID regulator 8 and the block 6 having the single-track model having longitudinal dynamics 6.

FIG. 12 shows a block diagram of another system for determining lateral/yaw dynamics decoupled from the longitudinal dynamics in the form of a structure having two degrees of freedom. An effective steering angle ($\delta_{eff}$) is processed in this case by feeding back a differential signal from the output signals of two parallel branches of a feedback loop 9 to the effective steering ($\delta_{eff}$) as an input signal.

As illustrated in FIG. 12, the first branch of the loop contains a filter function (Q) and a block 10. The second branch contains a series circuit made of a single-track model having longitudinal dynamics (6) and a block 11 having the product of the filter function (Q) and an inverse transfer function of a single-track model (ESM). In a preferred embodiment, a low-pass or PT1 filter is used for the filter function Q:

$$Q = \frac{1}{T_Q(v)s + 1},$$

$T_Q(v)$ representing a time constant, for which either a fixed value is assumed or which is adapted to the velocity v.

Methods consistent with the present invention may implemented in one or more computer program products, which may comprise computer readable storage media. A program may be stored as software on a computer readable storage medium, which allows a data processing system, a calculator, or a computer (after being loaded into a memory or working memory of a device of this type) to influence the yaw torque of a motor vehicle on the basis of at least one input variable. This may be derived from known regulating methods and/or driver assistance systems installed in parallel, in such a way that the yaw torque is influenced on the basis of a model-supported pilot control by applying a stabilizing additional yaw torque with processing of at least three input variables derived from sensor systems and/or known vehicle dynamic regulating systems and/or driver assistance systems installed in parallel. Methods may then be executed as described above.

Consistent with the present invention, an intervention may be performed as a pilot control even before the occurrence of interfering deviations. Known regulating methods and driver assistance systems having particular actuators may, in certain embodiments, be used in conjunction with and to implement aspects of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for providing directional stability for a motor vehicle by influencing a yaw torque of the vehicle, the method comprising the acts of:
   determining a stabilizing yaw torque using a model-supported pilot control, wherein at least one of lateral dynamics and yaw dynamics are decoupled from the longitudinal dynamics; and applying the stabilizing yaw torque to the motor vehicle to influence the yaw torque of the vehicle.

2. The method according to claim 1, wherein the model-supported pilot control is based on a single-track model that considers longitudinal dynamics.

3. The method according to claim 2, wherein the single-track model is simulated as a parametric linear time-invariant system, and wherein at least longitudinal-dynamic variables of velocity and longitudinal acceleration are interpreted as varying parameters.

4. The method according to claim 3, wherein chronological changes of the velocity are neglected while the longitudinal acceleration is handled as a varying parameter.

5. The method according to claim 1, wherein at least one differential variable is used in the model-supported pilot control as a control signal for the stabilizing yaw torque.

6. The method according to claim 1, wherein using the model-supported pilot control includes:
subjecting an effective steering angle, after reshaping by a single-track model, to a regulated pilot control using a PID regulator and a single-track model having longitudinal dynamics in a feedback loop.

7. The method according to claim 1, wherein an effective steering angle is processed in a structure having two degrees of freedom, wherein the effective steering angle is processed by feeding back a differential signal from the output of two branches of a feedback loop to the effective steering as an input signal.

8. The method according to claim 7, wherein the differential signal is fed back from output signals of a first branch containing a filter function and of a second branch having a series circuit including a single-track model having longitudinal dynamics and a product of the filter function and an inverse transfer function of a single-track model.

9. The method according to claim 1, wherein using the model-supported pilot control includes storing stationary values to represent a model.

10. The method according to claim 1, wherein the model-supported pilot control uses actuators for lateral torque distribution of at least one of a front axle and a rear axle, the actuators being provided in regulators.

11. The method according to claim 1, wherein the model-supported control is activated event-discretely, an event-discrete startup being caused by a corresponding signal.

12. The method according to claim 1, further comprising:
detecting deviations as vehicle properties that are to be unaffected by correction and compensation measures.

13. A method for providing directional stability for a motor vehicle by influencing a yaw torque of the vehicle, the method comprising the acts of:
determining a stabilizing yaw torque using a model-supported pilot control; and
applying the stabilizing yaw torque to the motor vehicle to influence the yaw torque of the vehicle; wherein
using the model-supported pilot control includes performing a pilot control method, and wherein an effective steering angle, a vehicle reference velocity, and a value for a longitudinal acceleration are used as input variables for the pilot control method.

14. The method according to claim 13, wherein at least one of a longitudinal torque and a longitudinal force distribution is considered an input variable for the pilot control method, wherein at least one of the longitudinal torque and the longitudinal force distribution is calculated from at least one of a longitudinal acceleration and a mean longitudinal slip at a front axle and a rear axle.

15. The method according to claim 13, wherein at least one of wheel speeds, mass, yaw moment of inertia, center of gravity position, axle slip angle, and a coefficient of friction is considered in the model as an input variable for the pilot control method.

16. A method for providing directional stability for a motor vehicle by influencing a yaw torque of the vehicle, the method comprising the acts of:
determining a stabilizing yaw torque using a model-supported pilot control; and
applying the stabilizing yaw torque to the motor vehicle to influence the yaw torque of the vehicle; wherein
a setpoint yaw rate is determined from a driver-preset steering angle and the setpoint yaw rate is used to calculate at least one differential value, wherein the differential value is calculated via an inverse single-track model into at least one of an angle value and a torque value and via an inverse expanded single-track model into at least one of an angle value and a torque value.

17. The method according to claim 16, wherein the at least one differential value, superimposed as a correcting angle preset on the driver-preset steering angle, is converted into at least one of an active front wheel steering and an active rear wheel steering.

18. A method for providing directional stability for a motor vehicle by influencing a yaw torque of the vehicle, the method comprising the acts of:
determining a stabilizing yaw torque using a model-supported pilot control; and
applying the stabilizing yaw torque to the motor vehicle to influence the yaw torque of the vehicle, wherein at least one of a proportional differential variable and a differential variable amplified using a PID regulator is used as a control signal for the stabilizing yaw torque in the model-supported pilot control.

19. An apparatus for providing directional stability for a motor vehicle by influencing a yaw torque of the motor vehicle, the apparatus comprising:
means for performing a model-supported pilot control to determine a stabilizing yaw torque, including using as input variables an effective steering angle, a vehicle reference velocity and a value for a longitudinal acceleration; and
at least one actuator for transmitting at least one output signal corresponding to the model-supported pilot control to influence the yaw torque of the motor vehicle.

20. An apparatus for providing directional stability for a motor vehicle by influencing a yaw torque of the motor vehicle, the apparatus comprising:
means for performing a model-supported pilot control to determine a stabilizing yaw torque;
at least one actuator for transmitting at least one output signal corresponding to the model-supported pilot control to influence the yaw torque of the motor vehicle; and
means for providing permanent and nonvolatile storage of a single-track model, an inverse single-track model, and an inverse expanded single-track model, wherein longitudinal-dynamic influences on lateral dynamics and yaw dynamics of the motor vehicle are simulated in the expanded single-track model.

21. The apparatus according to claim 20, wherein the means for performing the model-supported pilot control includes means for connecting to at least one of an active front wheel steering and an active rear wheel steering.

22. A computer program product, which comprises a computer-readable medium containing instructions for controlling a system to influence a yaw torque of a motor vehicle, the system operable to execute the instructions, the instructions comprising:
   instructions for obtaining at least one input variable from at least one of a sensor system, a regulating system, and a driver assistance system; and
   instructions for applying an additional stabilizing yaw torque to influence the yaw torque of the motor vehicle, wherein the additional stabilizing yaw torque is applied based on a model-supported pilot control and a processing of the at least one input variable, the model-supported pilot control including performing a pilot control method using as input variables an effective steering angle, a vehicle reference velocity, and a value for a longitudinal acceleration.

23. A computer program product according to claim 22, wherein the instructions for obtaining at least one input variable comprise instructions for obtaining at least three input variables.

24. A computer program product according to claim 22, wherein the instructions further comprise:
   instructions for determining the additional stabilizing yaw torque using the model-supported pilot control; and
   determining at least one actuator control variable for at least one actuator as an output signal based on the additional stabilizing yaw torque.

25. A method for providing directional stability for a motor vehicle by influencing a yaw torque of the vehicle, the method comprising the acts of:
   determining a stabilizing yaw torque using a model-supported pilot control; and
   applying the stabilizing yaw torque to the motor vehicle to influence the yaw torque of the vehicle, wherein the model supported pilot control consists of at least one of user driver inputs, longitudinal dynamic variables and yaw axis variables.

* * * * *